Patented Oct. 6, 1953

2,654,759

UNITED STATES PATENT OFFICE 2,654,759

DERIVATIVES OF N-HYDROXYMETHYL NICOTINIC ACID AMIDE AND A PROCESS FOR THE PRODUCTION THEREOF

Hans Suter, Dorflingen, and Ernst Habicht and Werner Kündig, Schaffhausen, Switzerland, assignors to Cilag Limited, Schaffhausen, Switzerland, a Swiss company No Drawing. Application April 12, 1951, Serial No. 220,728. In Switzerland April 17, 1950

6 Claims. (Cl. 260—295.5)

This invention relates to new derivatives of N-hydroxy-methyl-nicotinic acid amide and a process for the production thereof.

We have already found that the N-hydroxymethyl amide of nicotinic acid has an excellent curative effect on infections of the bile duct and the intestinal tract.

We have now found, according to the present invention, that the effectiveness of N-hydroxymethyl-nicotinic acid amide may be increased by introducing into the 2, 4, 5 or 6 position an N-hydroxymethyl-carbamido group, or a carboxyl group.

Accordingly the present invention provides new chemical compounds of the general formula

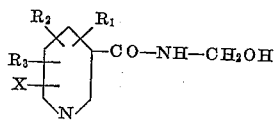

in which $R_1$, $R_2$ and $R_3$ are hydrogen atoms or lower alkyl, aryl or aralkyl radicals and X is an N-hydroxymethyl-carbamido group or a carboxyl group in the 2, 4, 5 or 6 position, and, where X has the latter meaning, salts of the said compounds.

The new compounds of the above general formula possess excellent germicidal properties and are suitable for use in the treatment of infections of the bile duct and the intestinal tract.

It was surprising that N-hydroxymethyl nicotinic acid amides carrying a further carboxyl group in the ortho, meta or para position should have the same effect as N-hydroxymethyl nicotinic acid amide itself. It was also not to be expected that the formaldehyde would be bound more tightly in such compounds than in N-hydroxymethylnicotinic acid amide so that the said compounds and their salts can readily be sterilised and can also be injected painlessly.

The new compounds of the present invention have a noticeably lower toxicity and consequently their therapeutic quotients are substantially more favourable than those of N-hydroxymethyl nicotinic acid amide.

The present invention also provides a particularly advantageous process for the production of these new derivatives of N-hydroxymethyl nicotinic acid amide wherein formaldehyde or a compound yielding formaldehyde is reacted with a compound of the general formula:

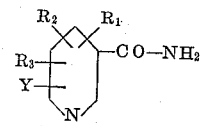

in which Y represents a carbamido group or a carboxyl group in the 2, 4, 5 or 6 position.

Suitable compounds yielding formaldehyde include trioxymethylene and paraformaldehyde.

The reaction is preferably carried out in alkaline medium since by-products may be formed when working at a pH below 7. The necessary hydrogen ion concentration can be adjusted by use of the hydroxides of alkali or alkaline earth metals or salts thereof with weak acids, for example carbonates, or else by use of organic amines.

The compounds which contain a free carboxyl group are preferentially isolated in the form of their salts, for example sodium or calcium salts, or as salts of organic amines such for example as diethylamine, diethanolamine and morpholine. For this purpose the salt corresponding to the condensation medium employed can be precipitated with an organic water-miscible solvent. The new compounds can also be isolated in the form of quaternary salts, for example with the help of alkyl halides, alkyl sulphates or alkylsulphonis acid alkyl esters.

The following examples show how the process of the invention may be carried into effect:

Example 1

370 gms. of pyridine-3,5-dicarboxylic acid-mono-amide are suspended in 830 ccs. of water, and approximately 160 ccs. of a 10% sodium hydroxide solution are added with stirring. The reaction mixture is heated on the water bath to 80° C. and 580 ccs. of 36% aqueous formaldehyde solution are added with stirring. The reaction mixture is kept at 80° C. for 15 minutes and the hydrogen ion concentration is adjusted to a pH of 9 to 10 with the aid of sodium hydroxide solution.

Active charcoal is then added, the liquid is filtered off and adjusted to a pH of 7 with formic acid. 18 litres of acetone are then stirred in and the liquid is cooled with water. A colourless granular precipitate is immediately produced which after 24 hours is separated by suction filtration and washed with acetone. By vacuum drying at 30 to 40° C. there is obtained a sodium salt of pyridine-3,5-dicarboxylic acid-mono-N-hydroxymethyl amide as a colourless powder in a quantity of 470 gms., i. e. 97% of the theoretical yield, which dissolves to the extent of 20% in cold water with a practically neutral reaction.

Analysis: $C_8H_7O_4N_2Na.2H_2O$
Calculated: C, 37.80%
H, 4.36%
N, 11.02%
Found: C, 38.12%
H, 4.18%
N, 11.10%
Formaldehyde determination with dimedon
Calculated: $CH_2O$ 11.80%
Found: $CH_2O$ 11.45% 11.65%

The sodium salt thus obtained can very readily be reprecipitated from water by means of acetone. The free compound can be obtained by careful acidification of the aqueous solution of a salt of pyridine-3,5-dicarboxylic acid-mono-N-hydroxymethyl amide. It does not show a sharp melting point but decomposes slowly on heating. (The pyridine-3,5-dicarboxylic acid mono-amide was obtained by amidation of pyridine-3,5-dicarboxylic acid mono-methyl-ester with aqueous ammonia solution. Melting point of the mono-amide: 272–273° C. with decomposition.)

Example 2

40 gms. of pyridine-3,5-dicarboxylic acid di-amide are stirred with 120 ccs. of 36% formaldehyde solution and the whole is adjusted to a pH of 8 with a 2 N sodium carbonate solution. The reaction mixture is then heated on the water bath until all is dissolved and is then cooled with ice water and allowed to stand for 20 hours. The solution is then evaporated in vacuo at 30° C. to drive off excess formaldehyde, the residue is dissolved in 350 ccs. of hot water, charcoal is added, the mixture is filtered and the clear colourless filtrate is diluted with 100 ccs. of ethanol. On cooling pyridine-3,5-dicarboxylic acid-bis-(N,N'-hydroxy-methyl)-amide crystallises out in a quantity of 27–30 gms. The new compound melts with decomposition at 210–215° C. and dissolves fairly readily in water and dilute acids. It is less readily soluble in organic solvents.

Example 3

25 gms. of 2,6-dimethylpyridine-3,5-dicarboxylic acid diamide (obtained from the dichloride with ammonia, Fp: 326–330° under decomposition recrystallised from water, colourless prisms) and 65 ccs. of a solution of 36% formaldehyde, which has been put on a pH of 7,2–7,3 with a solution of sodium bicarbonate, are to be heated under slight boiling. After 7 minutes everything is dissolved; a further 5 minutes it has to be boiled and then evaporated to dryness. The residue is dissolved in ethanol abs., the same volume of benzole is added and afterwards evaporated to dryness in order to remove the moisture. The mass then is dried over pentoxide in a high vacuum. The 2,6-dimethyl-pyridine-3,5-dicarboxylic-acid-bis-(N-hydroxymethyl-amide) obtained in this way represents a colourless, amorphous powder which from 60° C. is melting with decomposition. The new compound dissolves very readily in cold water, methanol and ethanol but is less soluble in ether.

Example 4

50 gms. of 2,6-dimethylpyridine-3,5-dicarboxylic acid-monoamide (obtained from the monoethylester and ammonia, colourless crystals recrystallised from ethanol, Fp: 262° under decomposition) in 200 ccs. of water, are to be treated with 2 N sodium hydroxide until complete dissolution has occurred. The solution is filtered, 70 ccs. of 36% formaldehyde are added, adjusted to a pH of 7,2 by adding a solution of concentrated sodium carbonate and the whole is to be boiled during one hour. After cooling acetone is added, the fine grained precipitate is dissolved with little ethanol and reprecipitated with acetone. In this way 55 gms. of pure sodium salt of the 2,6-dimethylpyridine-3,5-dicarboxylic acid-mono-N-hydroxy-methyl-amide are obtained. The sodium salt shows a point of decomposition, fusibility respectively, of 205–208° C. at an increase of temperature of 7,3° C./min. which depends on the speed of heating up. The new compound is easily soluble in water, boiling methanol and ethanol, less soluble in acetone and dioxane.

The following can also be prepared in an analogous manner to that described in examples:

From 2,4,6-trimethylpyridine-3,5-dicarboxylic acid diamide and formaldehyde: 2,4,6-trimethylpyridine-3,5-dicarboxylic-acid-bis-(N-hydroxymethyl amide).

From 2,4,6-trimethylpyridine-3,5-dicarboxylic acid mono amide and formaldehyde: 2,4,6-trimethylpyridine-3,5-dicarboxylic acid mono-N-hydroxymethyl amide.

From 2,6-dimethyl-4-phenylpyridine-3,5-dicarboxylic acid mono amide and formaldehyde: 2,6-dimethyl-4-phenyl-pyridine-3,5-dicarboxylic acid mono-N-hydroxymethyl amide.

What we claim is:

1. New chemical compounds selected from the group consisting of pyridine-3,5-dicarboxylic acid-N-methylolamides of the general formula

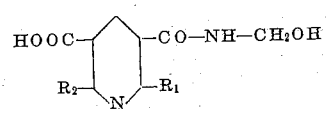

in which $R_1$ and $R_2$ are substituents selected from the group consisting of hydrogen atoms and lower alkyl radicals, and alkali metal salts of said pyridine-3,5-dicarboxylic acid N-methylolamides.

2. Process for the production of new pyridine-3,5-dicarboxylic acid N-methylolamides, comprising reacting formaldehyde in the presence of alkali metal hydroxides with a compound of the formula

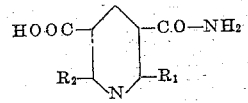

wherein $R_1$ and $R_2$ are substituents selected from the group consisting of hydrogen atoms and lower alkyl radicals, and isolating the formed N-hydroxymethyl compounds as their alkali metal salts.

3. The process as claimed in claim 2, wherein formaldehyde is reacted in an aqueous solution of sodium hydroxide with pyridine-3,5-dicarboxylic acid-monoamide, and the formed sodium salt of pyridine-3,5-dicarboxylic acid mono-N- hydroxymethyl amide is precipitated by mixing the reaction mass with acetone.

4. The process as claimed in claim 2, wherein formaldehyde is reacted in an aqueous solution of sodium hydroxide with 2,6-dimethyl-pyridine-3,5-dicarboxylic acid mono amide, and the formed sodium salt of 2,6-dimethyl-pyridine-mono-N-hydroxymethyl amide is precipitated by mixing the reaction mass with acetone.

5. The new chemical compound of the formula

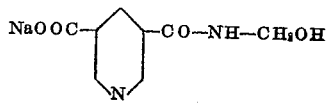

6. The new chemical compound of the formula

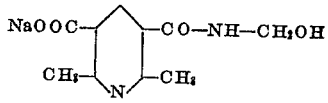

HANS SUTER.
ERNST HABICHT.
WERNER KÜNDIG.

References Cited in the file of this patent

FOREIGN PATENTS

| Number | Country | Date |
| --- | --- | --- |
| 203,947 | Switzerland | 1939 |